(12) United States Patent
Jones

(10) Patent No.: US 7,187,813 B2
(45) Date of Patent: Mar. 6, 2007

(54) OPTICAL TRANSISTOR

(75) Inventor: Richard Jones, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/040,362

(22) Filed: Jan. 20, 2005

(65) Prior Publication Data

US 2006/0159383 A1 Jul. 20, 2006

(51) Int. Cl.
G02F 1/035 (2006.01)
G02F 1/025 (2006.01)
H01L 33/00 (2006.01)

(52) U.S. Cl. .............................. 385/2; 385/131; 257/83; 257/84

(58) Field of Classification Search .............. 257/83–84
See application file for complete search history.

(56) References Cited

U.S. PATENT DOCUMENTS

| 6,298,177 | B1 | 10/2001 | House |
| 6,829,262 | B1* | 12/2004 | Ackerman et al. ............ 372/32 |
| 2003/0021568 | A1* | 1/2003 | Samara-Rubio et al. .... 385/132 |
| 2003/0142943 | A1 | 7/2003 | Yegnanarayanan et al. |
| 2004/0099870 | A1* | 5/2004 | Ono et al. ..................... 257/79 |
| 2004/0212874 | A1* | 10/2004 | Kim et al. ................... 359/334 |

FOREIGN PATENT DOCUMENTS

WO 2006/000681 5/2006

OTHER PUBLICATIONS

Liu et al., "A High-Speed Silicon Optical Modulator Based on a Metal-Oxide-Semiconductor Capacitor," Nature Publishing Group, London GB, Feb. 12, 2004, vol. 427, pp. 615-618.
Rong et al., "Raman Gain and Nonlinear Optical Absorption Measurements in a Low-Loss Silicon Waveguide," Applied Physics Letters, American Institute of Physics, Melville, NY, USA, Sep. 20, 2004, vol. 85, No. 12, pp. 2196-2198.

* cited by examiner

Primary Examiner—Michelle Connelly-Cushwa
Assistant Examiner—Jerry T Rahll
(74) Attorney, Agent, or Firm—Blakely, Sokoloff, Taylor & Zafman LLP

(57) ABSTRACT

An optical transistor is disclosed. An apparatus according to aspects of the present invention includes optical waveguide disposed in semiconductor material. A diode structure is disposed in the optical waveguide. The diode structure includes P and N regions. An electrical switch coupled to the P region and the N region of the diode structure. The electrical switch is coupled to switchably short circuit the P and N regions of the diode structure together.

26 Claims, 2 Drawing Sheets

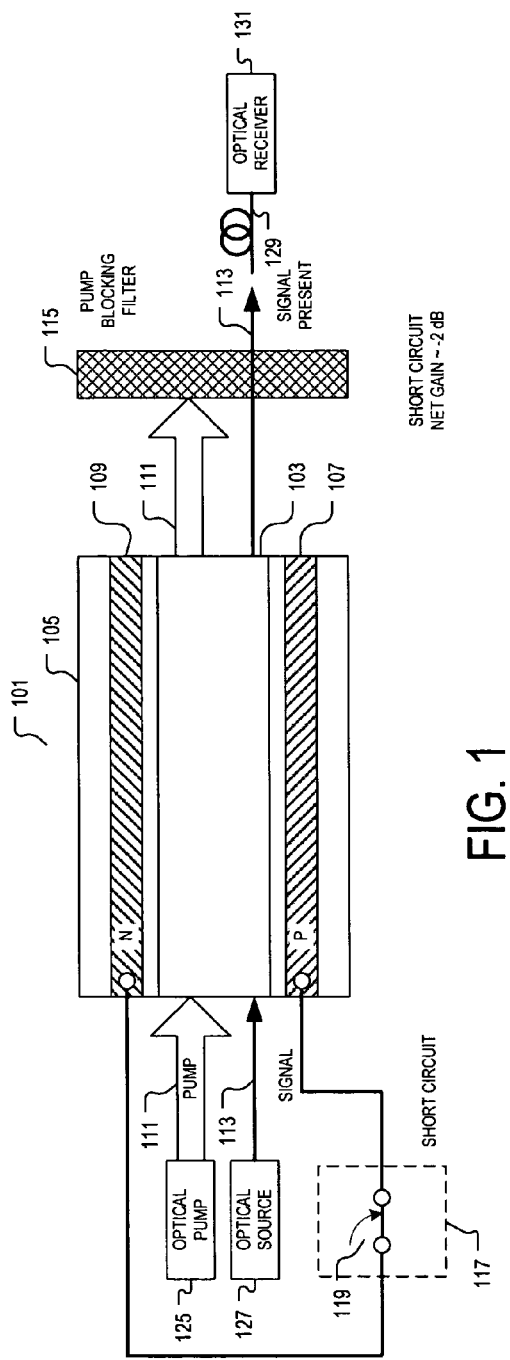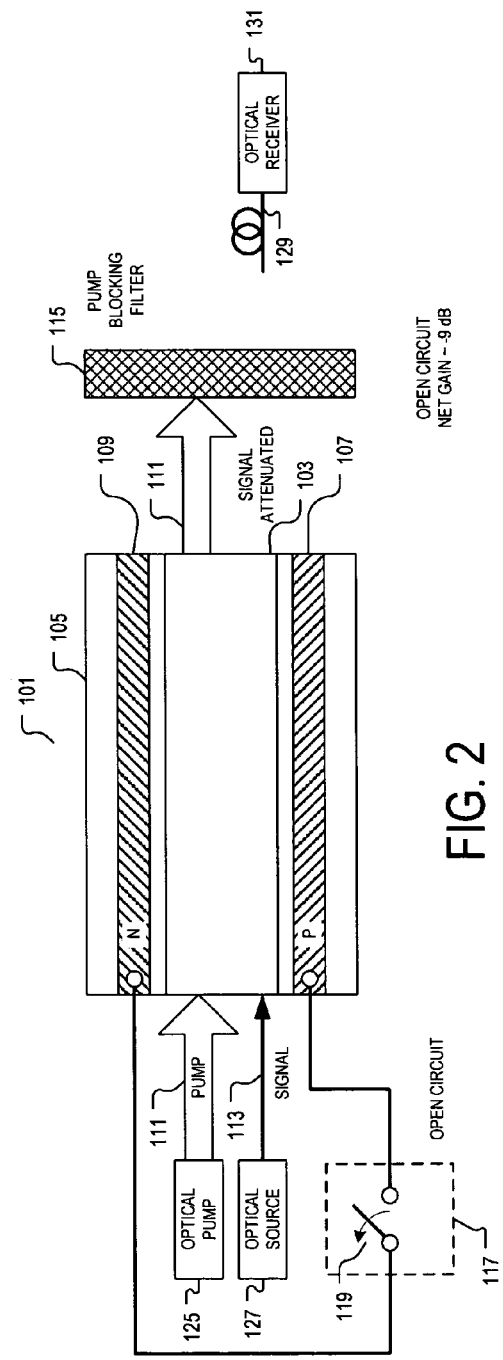

OPTICAL TRANSISTOR

BACKGROUND OF THE INVENTION

1. Field of the Invention

Embodiments of invention relate generally to optical devices and, more specifically but not exclusively relate to turning an optical beam off and on.

2. Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a block diagram illustrating one embodiment of a system including one embodiment of an optical transistor that is switched on in accordance with the teachings of the present invention.

FIG. 2 is a block diagram illustrating the embodiment of a system including the embodiment of the optical transistor that is switched off in accordance with the teachings of the present invention.

DETAILED DESCRIPTION

Figure 4:
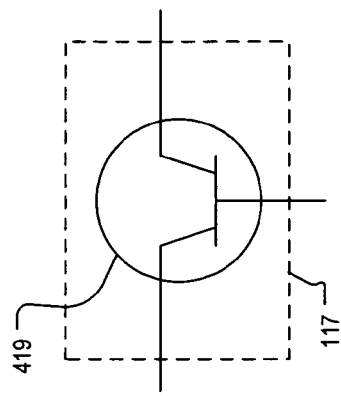
FIG. 4 is a schematic of an embodiment of a transistor employed to serve as an electrical switch in an embodiment of an optical transistor in accordance with the teachings of the present invention.

Methods and apparatuses for providing an optical transistor to switch an optical beam on/off and/or perform wavelength conversion are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

FIG. 1 is a block diagram illustrating generally one embodiment of a system including one embodiment of an optical transistor 101 that is switched on in accordance with the teachings of the present invention. As shown in FIG. 1, optical transistor 101 includes an optical waveguide 103 disposed in semiconductor material 105. In one embodiment, semiconductor material 105 includes a silicon layer of a silicon-on-insulator wafer. P region 107 and an N region 109 are P+ and N+ doped regions disposed in optical waveguide 103, which provide a diode structure disposed in optical waveguide 103. In one embodiment, the diode structure is a PIN diode with the intrinsic silicon of the PIN diode included in the optical waveguide 103. In one embodiment, an electrical switch 117 is coupled between P region 107 and N region 109 of the diode structure. In the example embodiment illustrated in FIG. 1, the function of electrical switch 117 is illustrated generally with a single pole single throw switch 119. As can be appreciated, switch 119 may be closed to create a short circuit condition between P region 107 and N region 109 of the diode structure. This embodiment is illustrated in FIG. 1 with switch 119 in the closed position to create the short circuit condition between P region 107 and N region 109 in accordance with the teachings of the present invention. In the alternative, FIG. 2 is an example block diagram illustrating that switch 119 may be opened to create an open circuit condition between P region 107 and N region 109 in accordance with the teachings of the present invention.

As shown in the illustrated embodiments, optical waveguide 103 is optically coupled to an optical pump 125 and an optical source 127. In one embodiment, optical pump 125 is a high power optical laser, which generates a high power first optical beam 111 having a first wavelength that is directed into optical waveguide 103. Optical source 127 is a lower power optical laser that generates a lower power signal, which is second optical beam 113 directed into optical waveguide 103. In the embodiment illustrated in FIG. 1, it is noted that first optical beam 111 and second optical beam 113 are directed into optical waveguide 103 at the same end. In another embodiment, it is appreciated that first optical beam 111 and second optical beam 113 may be directed into optical waveguide 103 at different ends in accordance with the teachings of the present invention.

In one embodiment, high power first optical beam 111 is a pump laser beam having a power of 1 W directed through silicon optical waveguide 103, which can amplify weaker second optical beam 113 in optical waveguide 103 via Raman amplification or stimulated Raman scattering (SRS). However, as will be discussed, when high power first optical beam 111 is shone through the silicon of optical waveguide 103, it also excites free carriers via two-photon absorption in optical waveguide 103. These free carriers then interact with the light in optical waveguide 103, including second optical beam 113 and cause optical loss for a time roughly equal to the free carrier lifetime in accordance with the teachings of the present invention.

Thus, in one embodiment, by embedding the diode structure including P and N regions 107 and 109 in optical waveguide 103, the free carriers can be selectively swept out of optical waveguide 103 in response to switch 119. By closing switch 119 and creating a short circuit condition between P region 107 and N region 109, the time the free carriers interact with the optical mode is reduced, which decreases two-photon initiated free carrier absorption in accordance with the teachings of the present invention. In the alternative, by opening switch 119, an open circuit condition is created between P and N regions 107 and 109, which allows the free carriers to remain in optical waveguide 103 longer to attenuate the light in optical waveguide 103 in accordance with the teachings of the present invention.

Therefore, as illustrated in FIG. 1, second optical beam 113 is directed into optical waveguide 103. With switch 119 closed, two-photon initiated free carrier absorption of second optical beam 113 in optical waveguide 103 is reduced such that optical beam 113 is emitted from optical waveguide 103 as shown. However, as illustrated in FIG. 2, with switch 119 opened, two-photon initiated free carrier absorption of second optical beam 113 in optical waveguide 103 is allowed to occur, which substantially attenuates second optical beam 113 within optical waveguide 103. As a result, second optical beam 113 is not emitted from optical waveguide 103 when switch 119 is opened in accordance with the teachings of the present invention.

In one embodiment, the net gain of second optical beam 113 is approximately −9 dB when there is an open circuit condition such that optical transistor 101 is, in effect, switched off. In contrast, the net gain of second optical beam 113 is approximately −2 dB in one embodiment when there is a short circuit condition such that optical transistor 101 is, in effect, switched on. Of course these net gain values are provided for example and explanation purposes only and other net gain values may be realized using other embodiments of an optical transistor in accordance with the teachings of the present invention.

In one embodiment, a pump blocking filter 115 is optically coupled to optical waveguide 103 to block or filter the pump or first optical beam 111 from propagating from optical waveguide 103. However, pump blocking filter 115 does not block second optical beam 113. In an embodiment of a system including optical transistor 101, an optical receiver 131 is optically coupled to receive second optical beam 113. In one embodiment, optical receiver 131 is optically coupled to receive second optical beam 113 through an optical fiber 129 from optical waveguide 103 in accordance with the teachings of the present invention.

As mentioned above, first optical beam 111 is in one embodiment an optical pump for use in generating spontaneous Raman scattering and amplifying the Raman signal of a selected frequency via stimulated Raman scattering (SRS) in accordance with the teachings of the present invention. In particular, when SRS occurs in the medium or silicon of an embodiment of optical waveguide 103, some of the energy of the optical pump is converted to light of a different frequency. This difference or shift in frequency is called the Raman frequency shift. In the illustrated embodiment, when the power level of optical beam 111 in optical waveguide 103 is sufficient, there is an emission of optical beam 113 having the second wavelength ($\lambda_S$) from optical waveguide 103 in accordance with the teachings of the present invention.

A value for the SRS gain coefficient for a material pumped at the first wavelength ($\lambda_P$) of optical beam 111 can be found by Equation 1:

$$g = 16\pi^3 c^2 S / (\hbar \omega^3 n_s^2 (N_0+1) \Gamma) \qquad \text{(Equation 1)}$$

where S is the spontaneous Raman scattering coefficient (proportional to $\omega_s^4$), h is Planck's constant, $n_s$ is the refractive index of the waveguide core material at the Stoke's frequency, $\omega_s$ is the angular frequency of the Stokes emission, $N_0$ is the Bose factor and $\Gamma$ is one half the full width at half maximum of the Stokes line (in units of angular frequency). Equation 1 (due to the $\omega_s^4$ factor of S) shows that the gain coefficient is linearly dependent on the Stokes angular frequency.

In one embodiment, the second wavelength ($\lambda_S$) of second optical beam 113 corresponds to a frequency substantially equal to the first order Stokes frequency of optical beam 111 in accordance with the teachings of the present invention. In an embodiment with the semiconductor material of optical waveguide 103 being silicon, the first wavelength ($\lambda_P$) of first optical beam 111 is approximately 1550 nm. In this embodiment, the Stokes wavelength is 15.6 THz below the pump wavelength of optical beam 111 such that the second wavelength ($\lambda_S$) of second optical beam 113 is approximately 1686 nm in accordance with the teachings of the present invention.

Figure 3:
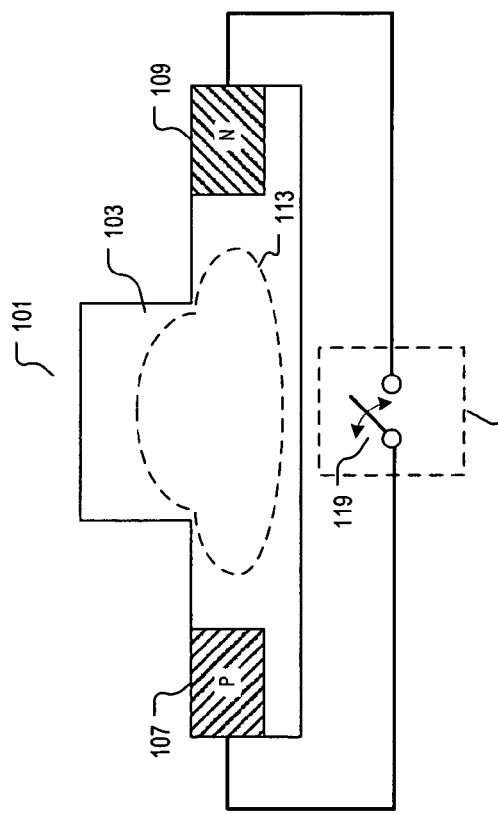
FIG. 3 is a cross section diagram of one embodiment of an optical transistor including an embodiment of a rib optical waveguide according to embodiments of the present invention.

FIG. 3 is a cross section diagram illustrating generally one embodiment of an optical transistor 101 including an embodiment of an optical waveguide 103 according to embodiments of the present invention. As shown in the depicted embodiment, optical waveguide 103 is a rib waveguide including a rib region and a slab region. In the embodiment illustrated in FIG. 3, a single mode optical beam 113 is shown propagating through the rib waveguide. As shown, the intensity distribution of the optical mode of optical beam 113 is such that the majority of the optical beam 113 propagates through a portion of the rib region of optical waveguide 103 towards the interior of the rib waveguide. In addition, a portion of optical beam 113 propagates through a portion of slab region towards the interior of the optical waveguide 103. As also shown with the optical mode of optical beam 113, the intensity of the propagating optical mode of optical beam 113 is vanishingly small at the "upper corners" of rib region as well as the "sides" of the slab region of optical waveguide 103.

In the embodiment shown in FIG. 3, P region 107 and N region 109 of the diode structure disposed in optical waveguide 103 are disposed at opposite lateral sides of the slab region in the optical waveguide 103, outside of the optical mode of optical beam 113. As illustrated in the example embodiment, the diode structure disposed in optical waveguide 103 is a PIN diode including P region 107 and N region 109. In the illustrated embodiment, the optical mode of optical beam 113 propagates through the intrinsic silicon of the PIN diode structure.

In the embodiment of FIG. 3, switch 119 of electrical switch 117 is illustrated as being coupled between P region 107 and N region 109. When switch 119 is closed, a short circuit condition is created between the P region 107 and N region 109 of the diode structure, which allows second optical beam 113 to be emitted from optical waveguide 103 in accordance with the teachings of the present invention. When switch 119 is opened, an open circuit condition is created between P region 107 and N region 109, which allows second optical beam 113 to be attenuated such that second optical beam 113 is effectively not emitted from optical waveguide 103 in accordance with the teachings of the present invention.

FIG. 4 is a schematic of an embodiment of a transistor 419 employed in electrical switch 117 in an embodiment of an optical transistor 101 in accordance with the teachings of the present invention. In one embodiment, transistor 419 can be used in place of the single pole single throw switch 119 illustrated in FIGS. 1, 2 and 3. The diode structure in optical waveguide 103 can be switched between an open circuit condition and a short circuit condition by using transistor 419 in accordance with the teachings of the present invention.

In one embodiment, by switching transistor 419, or switching electrical switch 119 in general, the net gain of the optical waveguide 103 can be modulated such that an amplitude modulator is realized with optical transistor 101 in accordance with the teachings of the present invention. For instance, in the above-described embodiment, an amplitude modulator with 7-dB extinction ratio is realized in accordance with the teachings of the present invention. An optical transistor or amplitude modulator according to embodiments the present invention does not rely on any externally applied electric field. In addition, an extremely low electrical power optical modulator may be realized with an extremely low electrical power device utilized for transistor 419 in accordance with the teachings of the present invention.

Figure 5:
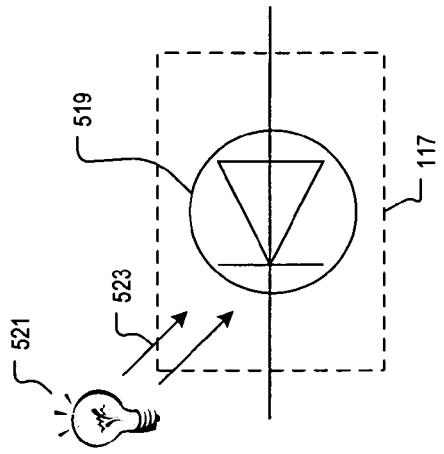
FIG. 5 is a schematic of an embodiment of a photodiode employed to serve as an electrical switch in an embodiment of an optical transistor in accordance with the teachings of the present invention.

FIG. 5 is a schematic of an electrical switch 117 including an embodiment of a photodiode 519 in accordance with the teachings of the present invention. In one embodiment, photodiode 519 is a reverse biased photodiode that can be used in place of the single pole single throw switch 119 illustrated in FIGS. 1, 2 and 3. The diode structure in optical waveguide 103 can be switched between an open circuit condition and a short circuit condition by selectively illuminating or not illuminating photodiode 519 in accordance with the teachings of the present invention.

As shown in the illustrated embodiment, an optical source 521 may be employed to selectively generate light 523 to illuminate photodiode 519 in accordance with the teachings of the present invention. In particular, if no light 523 is incident upon the photodiode 519, no current flows through photodiode 519. However, if light 523 hits the photodiode 519, a photocurrent is induced in photodiode 519.

Accordingly, when photodiode 519 is illuminated with light 523, a short circuit condition is created between P region 107 and N region 109, which allows second optical beam 113 to be emitted from optical waveguide 103 in accordance with the teachings of the present invention. When photodiode 519 is not illuminated with light 523, an open circuit condition is created between P region 107 and N region 109, which allows second optical beam 113 to be attenuated such that second optical beam 113 is not emitted from optical waveguide 103 in accordance with the teachings of the present invention.

In one embodiment, photodiode 519 may function with only a weak signal beam of light 523 hitting the photodiode 519. Thus, photodiode 519 can control or amplitude modulate a larger beam, such as second optical beam 113 traveling through optical waveguide 103, with a relatively weak signal beam of light 523 in accordance with the teachings of the present invention.

In one embodiment, optical transistor 101 may be utilized as a wavelength converter in accordance with the teachings of the present invention. For example, assume that light 523 is light at wavelength 1 while second optical beam 113 is light at wavelength 2. Assume that a data signal encoded on light 523. Light 523 of wavelength 1 hitting the photodetector 519 will switch optical beam 113 of wavelength 2 through optical transistor 101 such that the data signal encoded on light 523 is now encoded on optical beam 113 resulting in the optical transistor 101 functioning as a wavelength converter in accordance with the teachings of the present invention.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific wavelengths, dimensions, materials, times, voltages, power range values, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
an optical waveguide disposed in semiconductor material, the optical waveguide to receive a first optical beam having a first wavelength and a second optical beam having a second wavelength;

a diode structure disposed in the optical waveguide; and
an electrical switch coupled to a P region and an N region of the diode structure, the electrical switch coupled to switchably short circuit the P and N regions together to emit the second optical beam from the optical waveguide when there is an closed circuit condition and to substantially attenuate the second optical beam in the optical waveguide when there is an open circuit condition between the P and N regions.

2. The apparatus of claim 1 wherein the optical waveguide is to be optically coupled to a pump laser to receive the first optical beam and optically coupled to an optical source to receive the second optical beam, the first optical beam to amplify the second optical beam in the optical waveguide via Raman amplification.

3. The apparatus of claim 2 wherein the diode structure is coupled to sweep out free carriers from the optical waveguide generated in response to two-photon absorption in the optical waveguide when there is a short circuit condition between the P and N regions to substantially reduce attenuation of the second optical beam directed through the optical waveguide.

4. The apparatus of claim 2 wherein the Raman amplification occurs in the optical waveguide when the first optical beam having the first wavelength has a first power level to result in emission of the second optical beam of the second wavelength in the optical waveguide.

5. The apparatus of claim 1 wherein the substantial attenuation of the second optical beam in the optical waveguide results from two-photon absorption.

6. The apparatus of claim 1 further comprising a pump blocking filter optically coupled to the optical waveguide to block the first optical beam from propagating further from the optical waveguide, the pump blocking filter to allow the second optical beam to pass if present.

7. The apparatus of claim 1 wherein the optical waveguide comprises a silicon optical rib waveguide.

8. The apparatus of claim 1 wherein the electrical switch comprises a transistor responsive to an electrical signal.

9. The apparatus of claim 1 wherein the electrical switch comprises a photodiode response to an incident optical beam.

10. The apparatus of claim 9 wherein a digital signal encoded on the incident optical beam is encoded on the second optical beam directed from the optical waveguide.

11. The apparatus of claim 10 wherein the apparatus is included in an optical wavelength converter.

12. A method, comprising:
directing a first optical beam of a first wavelength into an optical waveguide defined in a semiconductor material;
directing a second optical beam of a second wavelength into the optical waveguide;
substantially attenuating the second optical beam in the optical waveguide when there is an open circuit condition between a P region and an N region of a diode structure disposed in the optical waveguide;
emitting the second optical beam from the optical waveguide when there is a short circuit condition between the P region and the N region of the diode structure disposed in the optical waveguide.

13. The method of claim 12 further comprising Raman amplifying the second optical beam with the first optical beam when there is the short circuit condition between the P region and the N region of the diode structure.

14. The method of claim 12 wherein emitting the second optical beam from the optical waveguide from the optical waveguide when there is the short circuit condition between the P region and the N region comprises sweeping out free carriers from the optical waveguide generated in response to two-photon absorption in the optical waveguide.

15. The method of claim 12 further comprising blocking the first optical beam from propagating from the optical waveguide.

16. The method of claim 12 further comprising switching a transistor coupled between the P and N regions of the diode structure.

17. The method of claim 16 further comprising modulating the second optical beam in response to switching the transistor.

18. The method of claim 12 further comprising illuminating a photodiode coupled between the P and N regions of the diode structure to create the short circuit condition between the P region and the N region of the diode structure.

19. The method of claim 18 further comprising wavelength converting a digital signal encoded on an optical beam used to illuminate the photodiode to a digital signal encoded on the second optical beam emitted from the optical waveguide.

20. A system, comprising:
an optical pump to generate a first optical beam having a first wavelength;
an optical source to generate a second optical beam having a second wavelength;
an optical waveguide disposed in semiconductor material, the optical waveguide including a diode structure disposed in therein, the optical waveguide optically coupled to receive the first and second optical beams;
an electrical switch coupled to a P region and an N region of the diode structure, the electrical switch coupled to switchably short circuit the P and N regions of the diode structure together to emit the second optical beam from the optical waveguide and to substantially attenuate the second optical beam in the optical waveguide when there is an open circuit condition between the P and N regions;
an optical receiver optically coupled to receive the second optical beam when emitted from the optical waveguide; and
an optical fiber optically coupled between the optical waveguide and the optical receiver to optically couple the optical receiver to receive the second optical beam when emitted from the optical waveguide.

21. The system of claim 20 wherein the diode structure is coupled to sweep out free carriers from the optical waveguide generated in response to two-photon absorption in the optical waveguide when the P and N regions are short circuited together through the electrical switch to substantially reduce attenuation of the second optical beam directed through the optical waveguide.

22. The system of claim 20 wherein Raman amplification occurs in the optical waveguide when the first optical beam having the first wavelength has a first power level to result in the emission of the second optical beam of the second wavelength in the optical waveguide.

23. The system of claim 20 wherein the substantial attenuation of the second optical beam in the optical waveguide results from two-photon absorption.

24. The system of claim 20 further comprising an optical filter optically coupled between the optical waveguide and the optical receiver to block the first optical beam.

25. The system of claim 20 wherein the electrical switch comprises a transistor.

26. The system of claim 20 wherein the electrical switch comprises a photodiode.

* * * * *